(12) United States Patent
Edwards et al.

(10) Patent No.: US 10,074,074 B2
(45) Date of Patent: Sep. 11, 2018

(54) SYSTEMS AND METHODS FOR AUTOMATED MONITORING OF THE CONTENTS OF A CONTAINER

(71) Applicant: WeighUp LLC, Bartlett, TN (US)

(72) Inventors: Brian Edwards, Cordova, TN (US); James Kegel, Memphis, TN (US); Phillip Geller, Memphis, TN (US)

(73) Assignee: Weighup LLC, Bartlett, TN (US)

( * ) Notice: Subject to any disclaimer, the term of this patent is extended or adjusted under 35 U.S.C. 154(b) by 0 days.

(21) Appl. No.: 15/685,989

(22) Filed: Aug. 24, 2017

(65) Prior Publication Data

US 2018/0060805 A1    Mar. 1, 2018

Related U.S. Application Data

(60) Provisional application No. 62/379,170, filed on Aug. 24, 2016.

(51) Int. Cl.
| | |
|---|---|
| *G06Q 10/08* | (2012.01) |
| *G06N 5/04* | (2006.01) |
| *G06K 7/14* | (2006.01) |
| *G06K 7/10* | (2006.01) |

(52) U.S. Cl.
CPC ....... *G06Q 10/087* (2013.01); *G06K 7/10366* (2013.01); *G06K 7/1413* (2013.01); *G06N 5/04* (2013.01)

(58) Field of Classification Search
None
See application file for complete search history.

(56) References Cited

U.S. PATENT DOCUMENTS

| | | | |
|---|---|---|---|
| 7,750,817 B2* | 7/2010 | Teller | B67D 3/0077 222/55 |
| 8,954,347 B1* | 2/2015 | Einfalt | G06Q 10/087 340/613 |
| 2006/0131404 A1 | 6/2006 | Dervishian | |
| 2006/0238346 A1 | 10/2006 | Teller | |
| 2009/0261974 A1 | 10/2009 | Bailey et al. | |
| 2011/0050431 A1 | 3/2011 | Hood et al. | |
| 2014/0242558 A1* | 8/2014 | Daragjati | G09B 19/00 434/219 |

\* cited by examiner

*Primary Examiner* — Allen C Chein
(74) *Attorney, Agent, or Firm* — The Noblitt Group, PLLC

(57) ABSTRACT

The present technology may relate to a substantially real-time container monitoring system for monitoring the content of containers such as beverage bottles. The monitoring system may be automated to record the content of the containers according to a metric such as the container's weight. The monitoring system may capture variances in the container's content for reconciliation with data such as sales data to expose irregularities in the consumption of the container's contents and may provide inferences as to the cause of those irregularities. Various embodiments of the monitoring system may comprise a scale assembly for producing scale data, a processor module communicatively linked to the scale assembly, and a front end server application for processing the scale data and presenting it to a user.

24 Claims, 3 Drawing Sheets

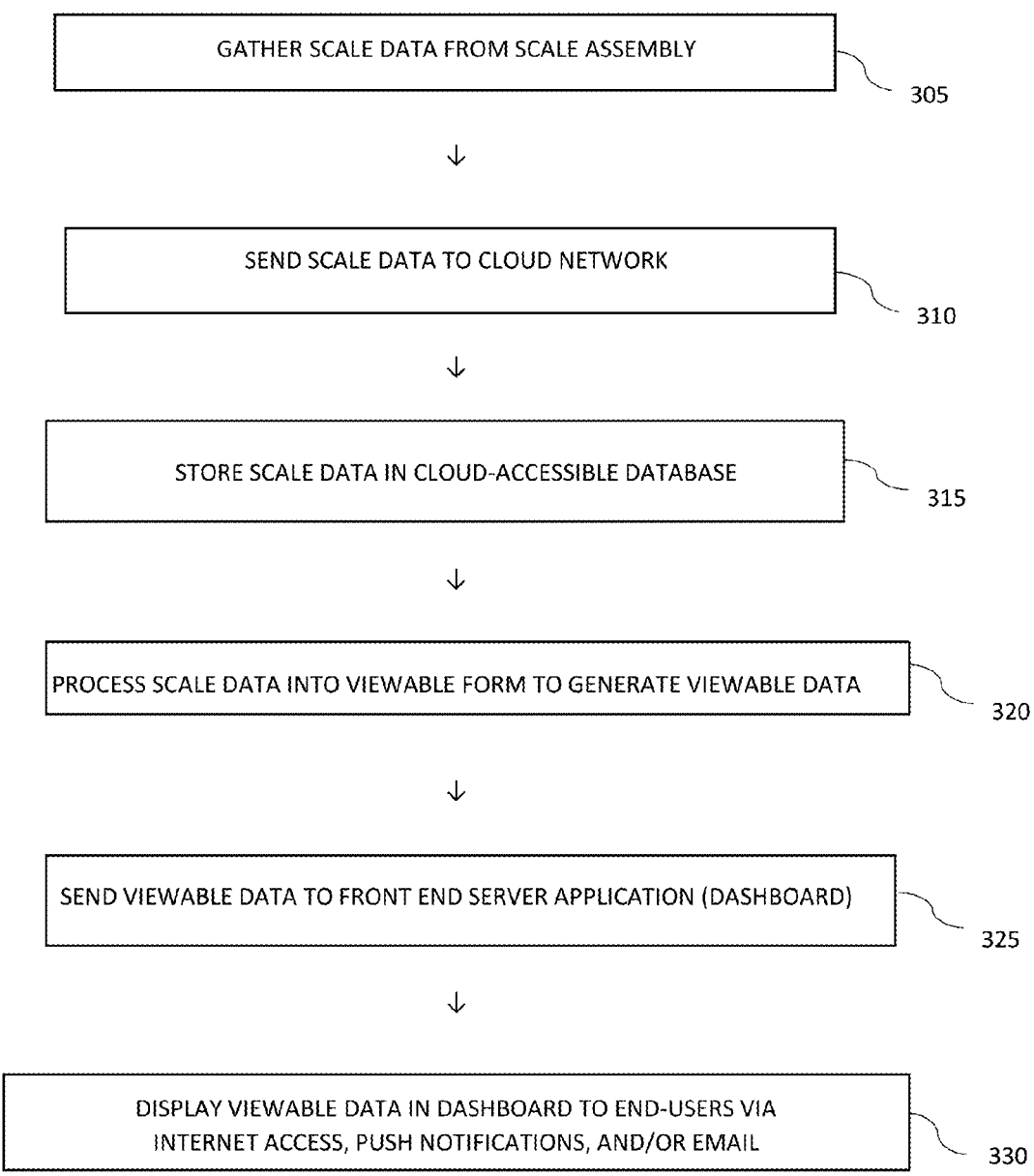

SYSTEMS AND METHODS FOR AUTOMATED MONITORING OF THE CONTENTS OF A CONTAINER

CROSS-REFERENCES TO RELATED APPLICATIONS

This application claims the benefit of U.S. Provisional Application Ser. No. 62/379,170, filed Aug. 24, 2016, and incorporates the disclosure that application by reference. To the extent that the present disclosure conflicts with the referenced application, however, the present disclosure is to be given priority.

BACKGROUND

Operating commercial bars and restaurants generally necessitates monitoring and control over the dispensation of beverages. Liquor beverages are particularly susceptible to various irregularities that are associated with decreasing the profitability of the sale of such beverages. Liquor sales may be affected by various dispensation factors including substitute pours, pour accuracy, backpours, spillage, theft, and a variety of other irregularities that may be intentional or inadvertent by bartenders and/or other restaurant staff.

Reducing revenue losses from liquor dispensation irregularities depends on the often tedious process of regularly measuring the amount of liquor in stock and aligning the amounts with sales information to expose those irregularities. Identifying problematic bartenders and/or other bar or restaurant staff may be time consuming, inaccurate, and too infrequent to effectively prevent lost revenue.

SUMMARY

The present technology may relate to a substantially real-time container monitoring system for monitoring the content of containers such as beverage bottles. The monitoring system may be automated to record the content of the containers according to a metric such as the container's weight. The monitoring system may capture variances in the container's content for reconciliation with data such as sales data to expose irregularities in the consumption of the container's contents and may provide inferences as to the cause of those irregularities. Various embodiments of the monitoring system may comprise a scale assembly for producing scale data, a processor module communicatively linked to the scale assembly, and a front end server application for processing the scale data and presenting it to a user.

BRIEF DESCRIPTION OF THE DRAWING FIGURES

A more complete understanding of the present invention may be derived by referring to the detailed description when considered in connection with the following illustrative figures. In the following figures, like reference numbers refer to similar elements and steps throughout the figures.

Elements and steps in the figures are illustrated for simplicity and clarity and have not necessarily been rendered according to any particular sequence or scale. For example, steps that may be performed concurrently or in different order are illustrated in the figures help to improve understanding of embodiments of the present invention.

The figures described are for illustration purposes only and are not intended to limit the scope of the present disclosure in any way. Various aspects of the present invention may be more fully understood from the detailed description and the accompanying drawing figures, wherein:

FIG. 3 is a flow chart illustrating an exemplary method of monitoring the dispensation of a plurality of beverage bottles.

DETAILED DESCRIPTION OF EXEMPLARY EMBODIMENTS

The present invention may be described in terms of functional block components and various processing steps. Such functional blocks may be realized by any number of components configured to perform the specified functions and achieve the various results. For example, methods and systems according to various aspects of the present invention may employ various process steps, apparatus, systems, methods, materials, etc. In addition, the present invention may be practiced in conjunction with any number of methods, data sources, databases, metrics, networks, algorithms, graphical interfaces, data viewing tools, and devices used to analyze, model, and report various aspects of beverage monitoring processes, and the system described is merely one exemplary application for the invention.

The particular implementations shown and described are illustrative of the technology and its best mode and are not intended to otherwise limit the scope of the present technology in any way. For the sake of brevity, conventional manufacturing, connection, preparation, process steps, and other functional aspects of the system may not be described in detail. Furthermore, the connecting lines shown in the various figures are intended to represent exemplary functional relationships and/or steps between the various elements. Many alternative or additional functional relationships or process steps may be present in a practical system.

Various aspects of the technology provide methods, apparatus, and systems for the substantially real-time monitoring of any container for variances in the container's weight, volume, or other preselected metric. In some embodiments, the container may be a beverage bottle that may be monitored in a bar, lounge, and/or restaurant. In some embodiments, the beverage bottles being monitored may comprise a variety of liquors and/or wine that may be open and in use for dispensation. Monitoring the beverage bottles, or other containers, may broadly comprise the frequent capturing of variances in the weight of the beverage bottles and reconciling the weights with sales data to identify irregularities.

While the exemplary embodiments described herein relate to beverage monitoring, the present systems and methods may be applied to any suitable business and/or other service that has dispensation or output activity that may be accounted for through the weight of the item being reduced as the item is dispensed or otherwise rendered to a consumer. For example, various aspects of the present systems and methods may be implemented in a pharmacy, a chemical laboratory, and/or a doctor's office.

Figure 1:
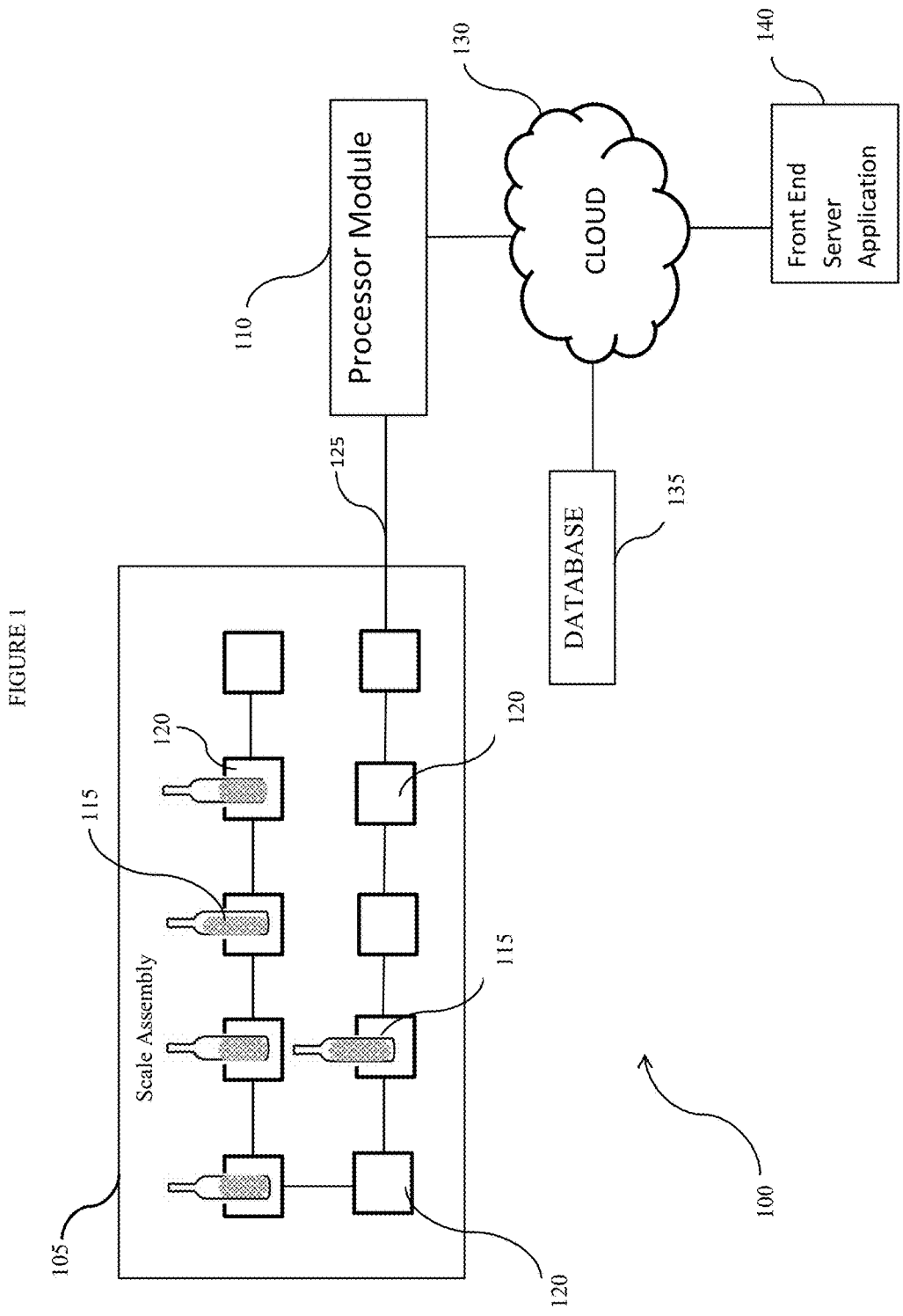
FIG. 1 is a block diagram of an exemplary embodiment of the beverage monitoring system.

Referring to FIG. 1, various embodiments of the beverage monitoring system 100 may comprise a scale assembly 105, a processor module 110, and a front-end server application 140 (also referred to as a "dashboard"). The beverage monitoring system 100 may assess the variances in the dispensation of beverages bottles 115, such as liquor pours from a bar in a lounge and/or restaurant. The scale assembly 105 may be configured to support the beverage bottle 115 and may measure the weight of the beverage bottle 115. The scale assembly 105 may be implemented in any location where bartenders and other bar and restaurant staff may retrieve and promptly replace the beverage bottles 115 to the scale assembly 105. The processor module 110 may be communicatively linked to the scale assembly 105 and be located proximate to the scale assembly 105 or located remotely. The processor module 110 may be configured to obtain and/or receive a variety of scale data from the scale assembly 105. The front-end server application 140 may be communicatively linked to the processor module 110 through a cloud network 130. The front-end server application 140 may retrieve scale data from the processor module 110 and process the scale data to identify irregularities in the dispensation of the beverage bottles 115, draw inferences about the cause of the irregularities, and to provide bar and restaurant personnel with an early alert system for problems.

The scale assembly 105 may comprise any suitable device capable of measuring the volume and/or weight of a container, such as the beverage bottle 115. For example, the scale assembly may comprise a weighing scale, an optical sensor, or any other device that can measure variances of the beverage bottle due to dispensation of its contents.

In various embodiments, the scale assembly 105 may comprise a plurality of individually addressable scale coasters 120. Each scale coaster 120 may comprise any suitable digital scale with a platform for receiving the beverage bottle 115 and supporting its weight. The scale coasters may be configured to measure the weight of each beverage bottle 115 (or other container) placed on each scale coaster 120. In various embodiments, each beverage bottle 115 may be identified and matched to its weight data. In another embodiment, the scale assembly 105 may comprise one scale that is configured to identify and measure the weight of beverage bottles 115 that are placed anywhere on the scale (not shown).

The scale assembly 105 may comprise an identification system for identifying the beverage bottles 115 placed on the scale coasters 120. The identification system may be equipped with any suitable identification hardware such as a near-field communication (NFC) reader or radio frequency identification (RFID) reader that reads the corresponding labels placed on each beverage bottle 115. The scale assembly 105 may transmit a product ID for each beverage bottle 115 to the processor module 110. The identification system may be located in close proximity to the scale coasters 120. For example, an RFID reader may be attached to each scale coaster 120. Such an arrangement may allow for the substantially simultaneous identification and weigh measurement of the beverage bottle 115 which may be beneficial in a fast-pace bar environment. In some embodiments, a user such as a bartender and/or other restaurant staff may manually input the name and type of beverage bottle 115 placed on a particular scale coaster 120.

Various embodiments of the processor module 110 may be communicatively linked to the scale assembly 105 through a communication line 125 or wirelessly. The processor module 110 may also be communicatively linked to the front-end server application 140 through the cloud network 130. The processor module 110 may receive and retrieve the scale data from the scale assembly 105 at regular intervals, in real-time, in substantially real-time, and/or when a user queries the processor module 110 through the front-end server application 140. Scale data produced in real-time may include scale data obtained at the actual time the beverage bottle 115 is replaced on the scale coaster 120.

Scale data produced in substantially real-time may include scale data obtained near the actual time the beverage bottle 115 is replaced on the scale coaster 120, such as within a few seconds. The weights of the beverage bottles 115 may be retrieved by the processor module 110 at any desired intervals, such as once per second. The processor module 110 may be configured to establish the physical location of any scale coaster 120 based on the individual address of the scale coaster 120 such that the individual address of each scale coaster 120 corresponds to a map of the scale assembly 105. The processor module 110 may be configured to run a diagnostic check of each scale coaster 120 and identify the individual address of any defective scale coaster 120.

In some embodiments, the processor module 110 may also comprise an identification system for identifying the beverage bottles 115, much like the identification system that may be part of the scale assembly 105. For example, the identification system may comprise an handheld RFID reader communicatively lined to the processor module 110 for reading an RFID tag on the beverage bottles 115 before they are placed on the scale coasters 120.

In various embodiments, the processor module 110 may be accessed by the end user to configure a scale assembly 105, communicatively link the processor module 110 to a new scale assembly 105, calibrate a scale coaster 120 in the scale assembly 105, enter bottle identification information (eg., the brand and type of liquor such as Patrón® tequila), the time that each bottle weight was measured, location of the scale in the restaurant (eg., east bar or west bar within the same restaurant), and/or the names of bartending staff working during the times bottle weights were measured.

The processor module 110 may transmit the scale data to the cloud network 130 at preselected regular intervals and/or upon query from an end user. In some embodiments, the processor module 110 may compile an array of weights and times from all the scale coasters 120 into a file for export into the cloud network 130. Such compiled reporting may be produced on demand by the end user and/or generated by the processor module 110 at regular intervals.

The cloud network 130 may be communicatively linked to one or more databases 135 configured to store and/or process the scale data into a viewable form suitable for reporting to the end user. The databases 135 may contain any information needed by the front-end server application 140 to produce processed data and draw inferences for the end user. For example, the databases 135 may be a drink recipe database and/or a point-of-sale (POS) database contain sales data for the beverage bottles 115. In some embodiments, an archival oriented database may be configured to send, receive, and/or store the data. A second database may be a user-facing database that may have a faster processing speed than the archival oriented database for viewing the data retrieved from the archival oriented database.

The scale data from the processor module 110 may be processed into the viewable form by a front-end server application 140. The front-end server application 140 may be communicatively linked to the processor module 110 and configured to retrieve sales data corresponding to the beverage bottle 115 from a sales database, retrieve drink recipes from a recipe database, process the scale data by reconciling the scale data with the sales data and/or the drink recipes, and identify an irregularity in the processed data corresponding to a discrepancy between the scale data and the sales data. In various embodiments, the processed data may comprise reconciliation of sales data and pours from each beverage bottle 115 as detected by weight variances. For example, one set of sales data may correspond to how much of a beverage should have been dispensed based on Point of Sale (POS) system records, and another set of sales data may correspond to how much of a beverage was actually dispensed. In some embodiments, the reconciliation process may be performed on a drink by drink basis. For example, when the front-end application 140 sees from the scale data that 2 OZ of Captain Morgan® was poured at 7:32 PM, when the POS data is considered, the database may attempt to find the POS system transaction on or around 7:32 PM for a merchandise item that, based on the recipe the end user input into a database, contains an approximately 2 OZ pour of Captain Morgan® rum. Accordingly, reconciliation may look for mismatches (also referred to as irregularities) between beverage dispensation scale data and sales data from the POS system.

Processing of the scale data may produce a variety of processed data for viewing by the end user. For example, the processed data may comprise inferences into the cause of identified irregularities. The inferences may comprise estimates or educated guesses that may be made based on the comparison of the scale assembly data to POS (Point of Sale) system data. For example, one type of inference may be classified as overpouring if a variance of pour overage fell outside the range defined by the owner for a particular cocktail. Another example of an inference may be substitute pouring. For example, suppose a Bahama Mama cocktail order was entered into the POS system and based on the recipe it should have 2 oz of well rum. However, the well rum weight indicates that no well rum was poured around that time, but around that time, the 2.1 oz Captain Morgan® rum was poured. Accordingly, the front-end server application 140 may infer a substitute pour was done because the included ingredient was not poured and a similar sized pour of something within the same category was poured with no associated sale in the POS system's data. In various embodiments, such inferences may be based on a zone within the bar or restaurant, timing, bartender, and combinations thereof.

In various embodiments, the processed data may comprise scoring of bartending staff for accuracy of pours. For example, scoring may be based on how close the actual pours are (based on scale data) to the recipe the end user input into the recipe database. In the example of a Bahama Mama, this drink includes 2 oz of Captain Morgan® rum based on the recipe the end user input into the database. However, suppose the actual pour from the bartender that made the drink was 2.1 OZ of Captain Morgan® rum. The scoring may be the comparison of the Actual vs. the Ideal pour data and compare them, so this particular drink could be a 95% score because the 0.1 OZ variance equates to 5% of the 2 OZ pour. In some embodiments, the score may comprise any suitable other metric that represents the accuracy and/or the precision with which a particular bartender and/or shift prepares drinks.

Additional data may be entered into the database 135 by the end user for inclusion in data processing. For example, drink recipes for the specific restaurant may be entered into a recipe database, such as the amount of a particular brand of liquor used in a proprietary drink recipe. Other additional data may comprise historical sales data, cost of each beverage bottle 115, and/or the price of each drink serving paid by the customer.

In some embodiments, the front-end server application 140 may further comprise an alert module configured to transmit an alert to a user when an irregularity in the processed data is identified. The alert may be transmitted to the user in any suitable method to bring the alert to the user's attention. For example, the alert module may transmit the alert via the internet to the user's email, a push notification such as to a cell phone, and/or an alert icon on the dashboard to draw the user's attention to the alert.

In various embodiments, the front-end server application 140 may present the processed data to the end user. In some embodiments, the front-end server application 140 may display the processed data and/or inferences in the form of a dashboard. The dashboard may comprise a plurality of data fields that may query the processor module 110 for the appropriate data for population into each data field. For example, the dashboard may have data fields for the beverage bottle 115 identification information, position of the beverage bottle 115 on the scale assembly, bartending staff names and schedules, POS system information, beverage bottle 115 weight measurements, and/or notification queues for alerting the end user to irregularities. In some embodiments, the dashboard may be configured to display various reports. The reports may comprise processed data such as the usage of particular liquors over time, ordering processes, liquor usage trends, and/or fluctuations in liquor cost.

The present systems and methods may be implemented in conjunction with via a machine configured to receive the relevant inputs, perform the various processes and functions, and take appropriate action. In one embodiment, the systems and methods are implemented on a dedicated machine or device, such that all or some of the functions are hard-wired. In other embodiments, the systems and methods may be implemented at least partially in software, such as in conjunction with instructions stored on a non-programmable or one-time programmable memory system, such as a conventional read-only memory. Other embodiments may be implemented in a fully programmable system, such as in conjunction with a general purpose computer with sufficient processing power, memory resources, and network throughput capability to handle the necessary workload placed upon it.

Figure 2:
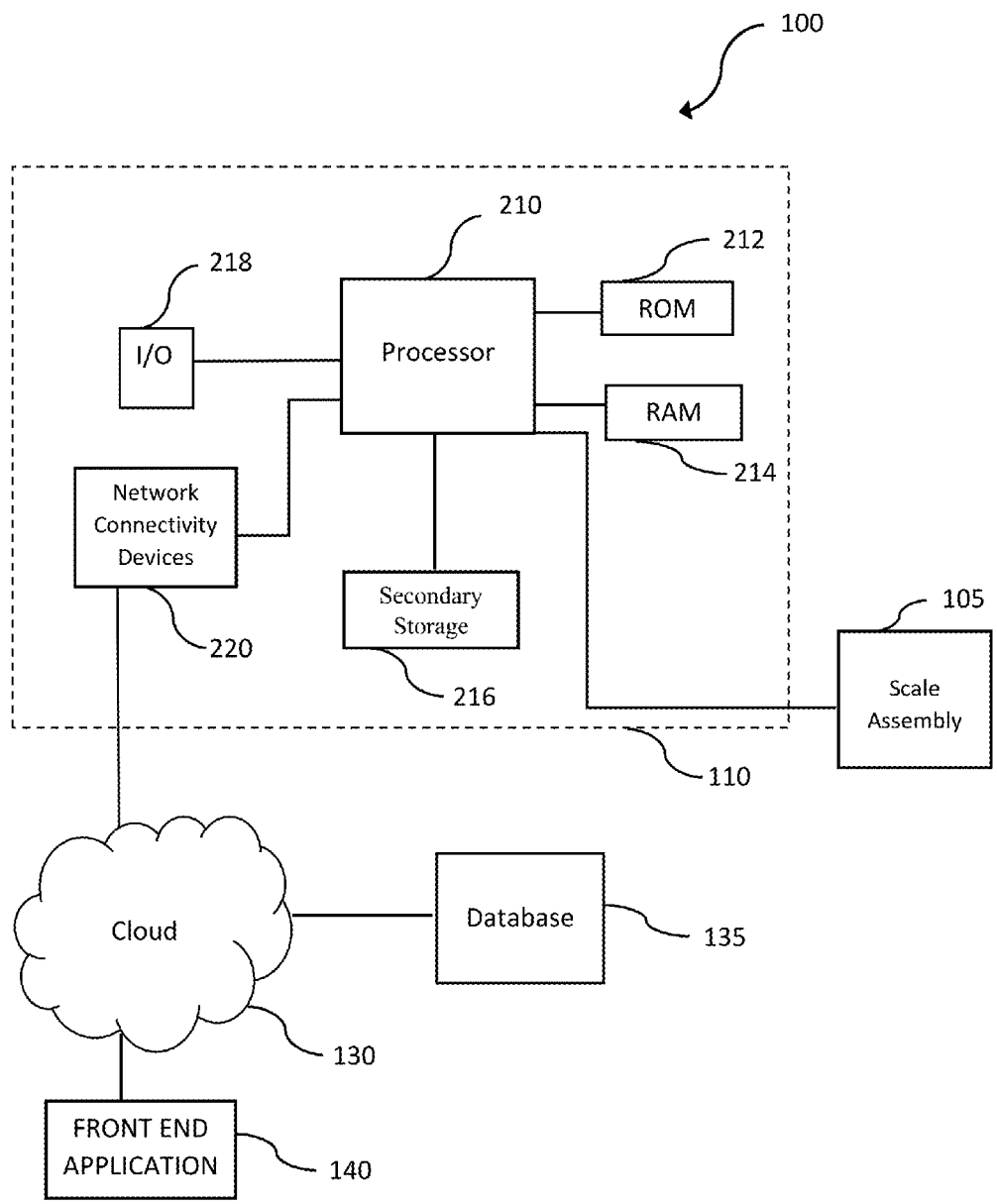
FIG. 2 is a block diagram of an exemplary embodiment of the beverage monitoring system.

Referring to FIG. 2, the processor module 110 may comprise a typical general-purpose computer system suitable for implementing one or more of the present embodiments, including a processor 210 in communication with memory devices, such as read only memory (ROM) 212, random access memory (RAM) 214, and secondary storage 216. The processor 210 may also connect to one or more input/output (I/O) devices 218 and/or network connectivity devices 220.

The processor 210 may comprise logic circuitry to perform various functions in response to inputs. The processor 210 may execute instructions, codes, computer programs, scripts, and/or the like, which may be received or accessed from any suitable source. For example, the processor 210 may comprise a conventional digital processor that responds to and processes the basic instructions provided via a set of inputs, for example to drive a computer. In one embodiment, the processor 210 may comprise a conventional central processing unit (CPU), such as a conventional microprocessor. The processor 210 may be implemented as one or more CPU chips. In one embodiment, the processor 210 retrieves instructions from secondary storage 216, stores them in RAM 214 for fast access, and executes the instructions for various tasks, such as retrieving and processing data from various sources.

In one embodiment, the processor 210 may be configured to process information and/or data received from a scale assembly 105. The processor 210 may receive the information and/or data from the scale assembly 105 via a network connectivity device 220 configured to interface with a cloud network 130. For example, the scale assembly 105 may first send the information and/or data it gathered to the cloud network 130. The cloud network 130 may then transmit the scale assembly 105 information and/or data to the network connectivity device 220. The network connectivity device 220 may be configured to further transmit the scale assembly 105 information and/or data to the processor 210 for processing.

In one embodiment, the scale assembly 105 may transmit scale data to the cloud network 130 using any suitable system or device configured to transmit information and/or data from a first source to a second source. For example, the scale assembly 105 may be configured to transmit information and/or data wirelessly (WIFI, Bluetooth™, and/or the like) or non-wirelessly such as a hardwire connection between the scale assembly 105 and the cloud network 130.

In one embodiment, the processor module 110 may be configured to interface with a database 135. The database 135 may comprise any suitable system configured to receive, store, and/or transmit information and/or data related to the processor module 110 and its various components. The database 135 may be configured to transmit and/or receive information and/or data via the cloud network 130. For example, information and/or data received by the scale assembly 105 may be configured to be stored in the database 135.

In one embodiment, the front-end server application 140 (also called a dashboard) may be configured to interface with the processor module 110 and its various components. The front-end server application 140 may be configured to receive and transmit information and/or data to and from the processor module 110 and its various components. For example, the front-end server application 140 may be configured to display information and/or data received by the scale assembly 105. In another example, the front-end server application 140 may be configured to receive information and/or data from the database 135. The front-end server application 140 may transmit and/or receive information wirelessly (WIFI, Bluetooth™) and/or via a hard-wire connection.

The ROM 212 may store instructions and data for operating the computer system 200. The ROM 212 may be a nonvolatile memory device. After data has been stored in the ROM 212, the data can only be removed or modified slowly, with difficulty, or not at all. The ROM 212 may include instructions and data for basic operation of the processor module 110, such as the initial boot program that runs when the processor module 110 is activated.

The RAM 214 may also store instructions and/or data for operating the processor module 110, and may comprise relatively fast volatile memory such that stored information is lost when deactivated. A volatile RAM 214 may be used by the processor 210 to store information that needs to be used very quickly, but may not store information permanently.

The secondary storage 216 may comprise a relatively large information storage medium and/or system, such as one or more disk drives or tape drives. The secondary storage 216 may be used, for example, for nonvolatile information storage and for overflow data storage device if the capacity of RAM 214 is exceeded, for example to store data retrieved from other sources and relatively static data, such as historic data or constants used in calculating KPI scores. In various embodiments, the secondary storage 216 may include one or more databases, such as for storing and organizing data. The secondary storage 216 may also be used to store programs that may be loaded into RAM 214 when such programs are selected for execution. Access to both ROM 212 and RAM 214 is typically faster than to secondary storage 216.

The I/O devices 218 may transfer information between the processor module 110 and peripheral devices. For example, the I/O devices may include printers, video monitors such as liquid crystal displays (LCDs) and touch screen displays, keyboards, keypads, switches, dials, mice, track balls, voice recognizers, card readers, and the like. The processor module 110 may include interface systems to facilitate communications with the I/O devices, such as networking cards, graphics cards, USB ports, and the like.

The network connectivity devices 220 facilitate communications between the processor module 110 and one or more networks. The network connectivity devices may comprise any suitable network connectivity devices, such as network interface cards, hubs, switches, bridges, routers, gateways, repeaters, modems, modem banks, ethernet cards, universal serial bus (USB) interface cards, serial interfaces, token ring cards, fiber distributed data interface (FDDI) cards, wireless local area network (WLAN) cards, and radio transceiver cards such as code division multiple access (CDMA) and/or global system for mobile communications (GSM) radio transceiver cards. The network connectivity devices 220 may also include one or more transmitters and receivers for wirelessly or otherwise transmitting and receiving signals.

The network connectivity devices 220 may enable the processor 210 to communicate with networks such as an Internet or one or more intranets. By operating in conjunction with a network, the processor module 110 may receive information from the network and/or output information to the network in the course of performing the beverage monitoring processes and functions.

Such information, which may include a sequence of instructions to be executed using the processor 210, may be received from and outputted to the network via a transmission medium. The transmission medium may comprise any appropriate medium for communicating information, such as electrical signals, optical signals, wireless connection, and/or RF communications. In one embodiment, information is communicated in the form of a computer data baseband signal or signal embodied in a carrier wave.

Referring to FIG. 3, a flow chart showing an exemplary method of using the beverage monitoring system 100 is shown wherein the processor module 110 may gather data from the scale assembly 105 and/or receive beverage bottle 115 identification data from the bartender or other restaurant staff (305). The processor module 110 may send the data to the cloud network 130 (310). In some embodiments, the cloud network 130 may transmit the data to the database 135 for storage (315). A front-end server application 140 (also called the dashboard) may query the database 135 to process data into a viewable form to generate viewable data (320). The database 135 may send the query results comprising the viewable data to the front-end server application 140 (325). The front-end server application 140 may display the viewable data in data field, reports, etc., to end users via internet access to the front-end server application 140, push notifications, e-mail, and the like (330).

In the foregoing description, the invention has been described with reference to specific exemplary embodiments. Various modifications and changes may be made, however, without departing from the scope of the present invention as set forth. The description and figures are to be regarded in an illustrative manner, rather than a restrictive one and all such modifications are intended to be included within the scope of the present invention. Accordingly, the scope of the invention should be determined by the generic embodiments described and their legal equivalents rather than by merely the specific examples described above. For example, the steps recited in any method or process embodiment may be executed in any appropriate order and are not limited to the explicit order presented in the specific examples. Additionally, the components and/or elements recited in any system embodiment may be combined in a variety of permutations to produce substantially the same result as the present invention and are accordingly not limited to the specific configuration recited in the specific examples.

Benefits, other advantages and solutions to problems have been described above with regard to particular embodiments. Any benefit, advantage, solution to problems or any element that may cause any particular benefit, advantage or solution to occur or to become more pronounced, however, is not to be construed as a critical, required or essential feature or component.

The terms "comprises", "comprising", or any variation thereof, are intended to reference a non-exclusive inclusion, such that a process, method, article, composition, system, or apparatus that comprises a list of elements does not include only those elements recited, but may also include other elements not expressly listed or inherent to such process, method, article, composition, system, or apparatus. Other combinations and/or modifications of the above-described structures, arrangements, applications, proportions, elements, materials or components used in the practice of the present invention, in addition to those not specifically recited, may be varied or otherwise particularly adapted to specific environments, manufacturing specifications, design parameters or other operating requirements without departing from the general principles of the same.

The present invention has been described above with reference to an exemplary embodiment. However, changes and modifications may be made to the exemplary embodiment without departing from the scope of the present invention. These and other changes or modifications are intended to be included within the scope of the present invention.

The invention claimed is:

1. A container monitoring system for substantially real-time monitoring of a container, the container monitoring system comprising:
   a scale assembly configured to support the container and measure the container according to a preselected metric to produce scale data; and
   a processor module communicatively linked to the scale assembly and configured to:
      receive and retrieve the scale data from the scale assembly in substantially real-time;
      receive container identification information; and
      transmit the scale data and the container identification information to at least one of a remote server and a remote database; and
   a front-end application communicatively linked to the processor module and configured to:
      retrieve sales data corresponding to the container from a database;
      process the scale data, wherein processing the scale data corresponds to reconciling the scale data with the sales data;
      identify an irregularity in the processed data, wherein an irregularity corresponds to a discrepancy between the scale data and the sales data;
      determine an inference about the cause of thee irregularity in the processed data, wherein the inference comprises a substitute pour where a beverage pour was not done according to a drink recipe and a similar sized pour of a different beverage in the same category and similar time occurred; and
      display the processed data and the inference to the user.

2. The container monitoring system of claim 1, wherein the preselected metric is the weight of the container.

3. The container monitoring system of claim 1, wherein at least one of the processor module and the scale assembly further comprise an identification system configured to identify the container to produce the container identification information.

4. The container monitoring system of claim 3, wherein the container identification information corresponds to at least one of the brand name of the container and the type of product in the container.

5. The container monitoring system of claim 4, wherein the identification system comprises at least one of:
   an RFID reader configured to identify the container by reading the label on the container; and
   a bar code scanner configured to identify the container by reading the bar code on the container.

6. The container monitoring system of claim 1, wherein the processor module receives the container identification information from the scale assembly.

7. The container monitoring system of claim 1, wherein the scale assembly comprises a plurality of scale coasters for receiving the container, wherein the scale coaster is configured to support the weight of the container.

8. The container monitoring system of claim 7, comprising a plurality of individually addressed scale coasters.

9. The container monitoring system of claim 1, wherein the inference comprises identifying an overpour where a variance of a pour is outside a range defined by a user for a particular beverage.

10. The container monitoring system of claim 1, wherein the inference comprises identifying an employee responsible for the irregularity based on the time and location of the irregularity and the bartenders or staff present at the same time.

11. The container monitoring system of claim 1, wherein the inference is a score corresponding to the accuracy of an employee in dispensation of the beverage bottle.

12. The container monitoring system of claim 1, wherein the front-end application further comprises an alert module configured to transmit an alert to a user when irregularity in the processed data is identified.

13. A beverage monitoring system for real-time monitoring of a beverage bottle, the beverage monitoring system comprising:
   a scale assembly comprising a plurality of scale coasters configured to:
      support the beverage bottle; and
      measure the weight of the beverage bottle to produce scale data; and
   a processor module communicatively linked to the scale assembly and configured to:
      receive and retrieve the scale data from the scale assembly in real-time;
      receive beverage bottle identification information; and
      transmit the scale data and the beverage bottle identification information to at least one of a remote server and a remote database; and
   a front-end application communicatively linked to the processor module and configured to:

retrieve sales data corresponding to the beverage bottle from a database;

process the scale data, wherein processing the scale data corresponds to reconciling the scale data with the sales data;

identify an irregularity in the processed data, wherein an irregularity corresponds to a discrepancy between the scale data and the sales data;

determine an inference about the cause of the irregularity in the processed data, wherein the inference comprises a substitute pour where a beverage pour was not done according to a drink recipe and a similar sized pour of a different beverage in the same category and similar time occurred; and display the processed data and the inference to the user accessing the front end application.

14. The beverage monitoring system of claim 13, wherein at least one of the processor module and the scale assembly further comprise an identification system configured to identify the beverage bottle to produce the beverage bottle identification information.

15. The beverage monitoring system of claim 14, wherein the beverage bottle identification information corresponds to at least one of the brand name of the beverage bottle and the type of beverage in the container.

16. The beverage monitoring system of claim 13, wherein the identification system comprises:

an RFID reader configured to identify the container by reading the label on the container; and a bar code scanner configured to identify the container by reading the bar code on the container.

17. The beverage monitoring system of claim 13, wherein the processor module receives the beverage bottle identification information from the scale assembly.

18. The beverage monitoring system of claim 13, wherein the scale assembly is further configured to detect that the container is on the scale coaster.

19. The beverage monitoring system of claim 13, comprising a plurality of individually addressed scale coasters.

20. The beverage monitoring system of claim 13, wherein the inference comprises identifying an overpour where a variance of a pour is outside a range defined by a user for a particular beverage.

21. The beverage monitoring system of claim 13, wherein the inference comprises identifying an employee responsible for the irregularity based on the time and location of the irregularity and the bartenders or staff present at the same time.

22. The beverage monitoring system of claim 13, wherein the inference is a score corresponding to the accuracy of an employee in dispensation of the beverage bottle.

23. The container monitoring system of claim 13, wherein the front-end application server further comprises an alert module configured to transmit an alert to a user when irregularity in the processed data is identified.

24. A method of monitoring the dispensation of a plurality of beverage bottles, comprising:

placing the plurality of beverage bottles into a beverage monitoring system, wherein the beverage monitoring system comprises:

a scale assembly comprising a scale coaster configured to support the beverage bottle and measure the weight of the beverage bottle to produce scale data; and a processor module communicatively linked to the scale assembly and configured to:

receive and retrieve the scale data from the scale assembly in real-time;

receive beverage bottle identification information; and transmit the scale data and the beverage bottle identification information to at least one of a remote server and a remote database; and a front-end application communicatively linked to the processor module and configured to:

retrieve sales data corresponding to the beverage bottle from a database;

process the scale data, wherein processing the scale data corresponds to reconciling the scale data with the sales data;

identify an irregularity in the processed data, wherein an irregularity corresponds to a discrepancy between the scale data and the sales data;

determine an inference about the cause of the irregularity in the processed data, wherein the inference comprises a substitute pour where a beverage pour was not done according to a drink recipe and a similar sized pour of a different beverage in the same category and similar time occurred; and display the processed data and the inference to the user accessing the front end application; and accessing the front-end application to view the processed data and the inference.

* * * * *